Patented Mar. 22, 1938

2,111,766

UNITED STATES PATENT OFFICE 2,111,766

SALAD DRESSING AND METHOD OF MAKING THE SAME

Simon Gelfand, Los Angeles, Calif.

No Drawing. Application August 19, 1936,
Serial No. 96,778

12 Claims. (Cl. 99—144)

My invention relates to an improved salad dressing and method of making the same. It relates also to the treatment of pineapple juice or pineapple pulp, or combinations thereof, as a step in preparing the same as a constituent of food products, such as salad dressings.

Dressings for salads in general comprise an emulsion of a vegetable oil and an aqueous constituent, usually a vinegar, in which various condiments are dissolved or dispersed in the aqueous media. Mayonnaise is one of the best known examples of a dressing for salads, as well as the modification of the usual mayonnaise dressing commercially known as salad dressing. Commercial mayonnaise is of a semi-solid consistency and contains approximately 75% of a liquid salad oil, 8 to 10% of egg yolks and 14 to 16% of a vinegar. In the so-called salad dressing, the proportion of oil is considerably decreased, the mayonnaise emulsion being diluted with a cooked starch paste. Proportions of ingredients in the so-called salad dressing may vary considerably. Usually, however, this type of salad dressing contains from 20 to 40% of oil, or at times somewhat more, and a somewhat higher percentage of a vinegar than employed in the conventional mayonnaise.

The major ingredients of salad dressings are subject to rancidity, the oil particularly undergoing certain changes when the product is exposed to light and air at ordinary temperatures. These changes result in the product being off odor, at times in separation, and possibly other effects, all tending to make the product unsalable after it has been stored and before it reaches the ultimate consumer.

The principal object of my invention is the production of an improved dressing for salads, principally a dressing of the mayonnaise or salad dressing type described hereinabove.

Another object is the provision of means for inhibiting the spoilage of salad dressings due to rancidification.

Another object is to introduce into a salad dressing a constituent having the effect not only of enhancing the flavor thereof but also of inhibiting spoilage.

A further object is to provide a method for treating a pineapple juice or pineapple pulp preliminary to the incorporation thereof into a food product of the salad dressing type.

I have discovered that, by adding to a mayonnaise or salad dressing product an appreciable proportion of comminuted pineapple, the juice of the pineapple, or merely the pulp thereof, I am able to reduce the spoilage and produce a final finished product having an improved flavor and increased palatability. Those skilled in the art understand, of course, that technically a modified mayonnaise must go under the term of a salad dressing or modified salad dressing, since the ingredients and proportions thereof in a mayonnaise are rather rigidly fixed by custom and regulation. However, I employ the term "mayonnaise" in order better to identify the type of product to which my present invention is largely directed. By comminuted pineapple, I mean to include all of the constituents of the pineapple, including the pulp and juice, as distinguished from a product which might comprise essentially the juice of a pineapple or a product which might comprise essentially the pulp without the juice. For convenience, any one of the three pineapple products identified, or combination thereof, may be spoken of as a pineapple constituent.

While an untreated pineapple constituent may be utilized in a salad dressing, I have discovered that if the pineapple constituent be first pretreated by heating it at a relatively high temperature for a short period of time, as more particularly described hereinbelow, before it is added to the salad dressing, still greater improvement is obtained. The natural pineapple product normally, by virtue of a constituent or constituents present, has a preservative effect upon the oil in the salad dressing mixture. When treated in accordance with my present invention, the pineapple constituent has a still greater preservative action, particularly with respect to fermentative processes. I have found that if the pineapple constituent be treated with a proportion of a mild acid, such as an organic acid, for example, as found in vinegar, prior to heat treatment, then a temperature of about 180 degrees F., maintained for ten to twenty minutes, produces very desirable results. Thus I may use not only acetic acid, normally the constituent present in commercial vinegar, but other organic acids which have the effect of increasing the hydrogen ion concentration in the pineapple juice. Examples of such acids are lactic acid, citric acid, tartaric acid, and the like. Inasmuch as the pretreated mixture of the pineapple constituent and organic acid are preferably introduced into the salad dressing directly after pretreatment, it is, of course, not advisable to use too large a proportion of acid or too great a concentration thereof. Otherwise, the final product may be too sour and unpalatable. I have found that if the amount of acid be such that the final product has an acidity of .8 to 1%, the amount of acid present will be ample to prevent fermentation. The amount of acidity depends, of course, upon the formula and specifically upon the moisture content thereof. In the usual type of formula employed, a concentration of 2% of acetic acid in the moisture phase is ample. As a specific illustration, a common type of vinegar employed in mayonnaise and similar salad dressings has a concentration of approximately 10% acetic acid. Usually the entire amount of vinegar of this strength called for by the formula may be first mixed with the pineapple constituent and treated at a temperature of about 180 degrees F. for from ten to twenty minutes and usually very desirable and satisfactory results obtained.

As a specific illustration, I take 45 parts of 10% vinegar and mix the same with 65 parts of pineapple juice. This mixture is heated to about 180 degrees F. and maintained at this temperature for ten to twenty minutes. The product is then cooled and is ready for incorporation in the usual formula. If a mayonnaise product is to be made, 10% of this material is added to the usual aqueous material going into the manufacture of the mayonnaise product.

According to another example, 330 parts of 10% vinegar are mixed with 960 parts of comminuted pineapple containing both the juice and the pulp. This mixture is then heated at about 180 to 185 degrees F. for from ten to twenty minutes, and the liquids drawn off, leaving, however, a substantial proportion of the liquids with the pulp, the pulp in this case not being pressed but only the amount of liquid allowed to drain which naturally flows therefrom. 30 to 35% of this pulp may then be incorporated with the mayonnaise paste, care being taken, of course, to mix the product thoroughly and disperse the aqueous material of the pulp and the pulp itself in the body of the mayonnaise paste.

When preparing a salad dressing employing a starch paste, a pretreated pineapple juice and vinegar product is produced in accordance with the first example given hereinabove. The starch paste is prepared by cooking together sugar, salt, corn starch, tapioca starch if desired, and a sufficient proportion of the pretreated pineapple juice and vinegar so that the starch paste, when gelatinized and cooled down, will have an acidity of 1.4% to 1.7% as acetic acid. The paste so prepared may contain from 30 to 50% of the pineapple juice. A mayonnaise emulsion is then prepared by emulsifying 35 parts of oil, 5 to 6 parts of yolk material, and a desired amount of mustard or other spices, until a heavy, butter-like substance is obtained. To this is then added gradually, while stirring, 55 to 60 parts of the previously prepared starch paste containing the pineapple juice, mixing being continued until a homogeneous product has been produced. In producing a salad dressing of this type, it is, of course, obvious that the starch paste itself may be modified, and the proportion thereof employed may vary. Following substantially the method of procedure described above, a satisfactory salad dressing may be produced containing from 40 to 70% of the starch paste having the pineapple juice constituent present.

I have found that a salad dressing containing pure pineapple juice, oil, egg yolks, spices, vinegar, sugar, salt and cereal may be produced wherein the amount of oil present is approximately 35% of the final product, the eggs and cereal functioning as emulsifying agents and the proportion being controlled so that an emulsion of semi-solid consistency is produced. The proportion of acid and flavoring constituents present, of course, is selected to give the taste effect desired.

Instead of employing the pineapple juice directly, I may prepare a concentrate thereof by evaporating the juice preferably under vacuum. This concentrate may be employed as an ingredient of the starch paste. A concentrate may also be produced by adding an acid ingredient to the pineapple juice before evaporation. In either case, the pineapple juice is pretreated, as described above, during the preparation of the concentrate so that the final product, capable of use in substantially any usual type of food product such as a salad dressing, retains its natural preservative action. The natural organoleptic constitutents of the pineapple juice are not injured by the concentrating step referred to or by the pretreatment of the pineapple juice with acid. On the contrary, the taste and aroma of the pineapple juice seem to be enhanced and a very desirable taste and flavor are imparted to the mayonnaise or salad dressing product.

In addition to the mayonnaise type of dressing or the other types of dressing wherein egg material contributes the major emulsifying effect, I may produce modified types of dressings containing a greatly decreased amount of egg material or no egg material at all. For example, a salad dressing in the form of an emulsion may be produced containing 25 to 40% of salad oil emulsified with aqueous material, including vinegar, pineapple juice, spices such as mustard, sugar and salt and employing vegetable gum as an emulsifying agent. More specifically such a product may contain 40% of oil, 30 to 40% of pineapple juice, 15% of vinegar (10% strength), 2% paprika flour, ½% gum tragacanth, together with sugar, spices, etc. In place of gum tragacanth, any of the other usual emulsifying agents may be employed either in combination with each other or in combination with egg materials. In general, salad dressings made without the egg material are more liquid and flowing in consistency. Those skilled in the art understand, of course, that emulsifying agents and other constituents employed are selected in accordance with the type of dressing desired.

I referred hereinabove to the use of salad oils or liquid vegetable oils as the main oleaginous constituent of the salad dressing. Such oils including cotton seed oil, corn oil, sunflower oil, sesame oil, olive oil and other liquid refined oils known in commerce and usually employed as constituents of salad dressings.

The term "salad dressing" is employed in the claims to include the mayonnaise type of salad dressing and other types of salad dressings comprising essentially emulsions of oleaginous and aqueous constituents wherein egg material and/or other emulsifying agents are employed and wherein normally a vinegar and various types of condiments and flavoring materials are present to provide the degree of tartness and character of flavor preferred. Other terms employed in the claims appear to be brought out adequately in the specification.

Having described my invention in detail, I wish it understood that I do not limit myself to the specific proportions and ingredients set out, but the invention is limited only by the scope of the appended claims.

What I claim as new and desire to protect by Letters Patent of the United States is:

1. The method of producing an improved salad dressing of a type containing an oil, vinegar, and an emulsifying agent, which comprises mixing together a proportion of a pineapple constituent and at least a portion of the vinegar of the formula, heating the mixture, and combining the resulting heat treated mixture with the remaining constituents of the formula to produce the final salad dressing product.

2. The method of producing an improved salad dressing which comprises heating a mixture of an edible organic acid and a pineapple constituent to an elevated temperature, and then combining the resulting mixture with the remaining ingredients of the salad dressing which include oil and egg material.

3. The method of claim 2 wherein the edible organic acid is vinegar.

4. The method of producing an improved salad dressing which comprises heating a mixture of an edible acid and a pineapple constituent to an elevated temperature, and then combining the resulting mixture with the remaining ingredients of the salad dressing which include a salad oil, egg material and a cooked cereal paste.

5. The method of claim 4 wherein the edible acid comprises vinegar and wherein the pineapple constituent comprises pineapple juice.

6. An improved salad dressing including a vegetable salad oil, egg material, a cooked cereal paste and a proportion of a pineapple constituent which has been heat treated in the presence of an added edible acid.

7. An improved salad dressing including a vegetable salad oil, egg material, and a cooked cereal paste in which is dispersed a pineapple constituent which has been heat treated in the presence of vinegar.

8. An improved salad dressing of the mayonnaise type including a vegetable salad oil, an emulsifying agent, and a proportion of a pineapple constituent which has been heat treated in the presence of an added organic acid.

9. An improved salad dressing including a salad oil, a cooked cereal paste, egg material, and a pineapple constituent which has been heat treated in the presence of an added acid, the salad oil being present in proportions of the order of 20% to 40% and the cereal paste in proportions of the order of 40% to 70%.

10. The method of producing an improved salad dressing which comprises initially heating a mixture including starch and a pineapple constituent to produce a starch paste with the heat treated pineapple constituent dispersed therein, and subsequently combining the resulting mixture with the remaining ingredients of the salad dressing which include a vegetable salad oil.

11. The method of producing an improved salad dressing which comprises heating a mixture including starch, an edible organic acid, and a pineapple constituent to produce a starch paste with the heat treated pineapple constituent dispersed therein, and subsequently combining the resulting mixture with the remaining ingredients of the salad dressing which include a vegetable salad oil.

12. An improved salad dressing of the mayonnaise type including a vegetable salad oil, egg material, and a cooked cereal paste in which is dispersed a heat treated pineapple constituent.

SIMON GELFAND.